Dec. 4, 1962  A. L. VERDIER  3,066,876
ROLLER MILLS, CALENDERS AND LIKE ROLLER MACHINES
Filed Dec. 18, 1959  9 Sheets-Sheet 4

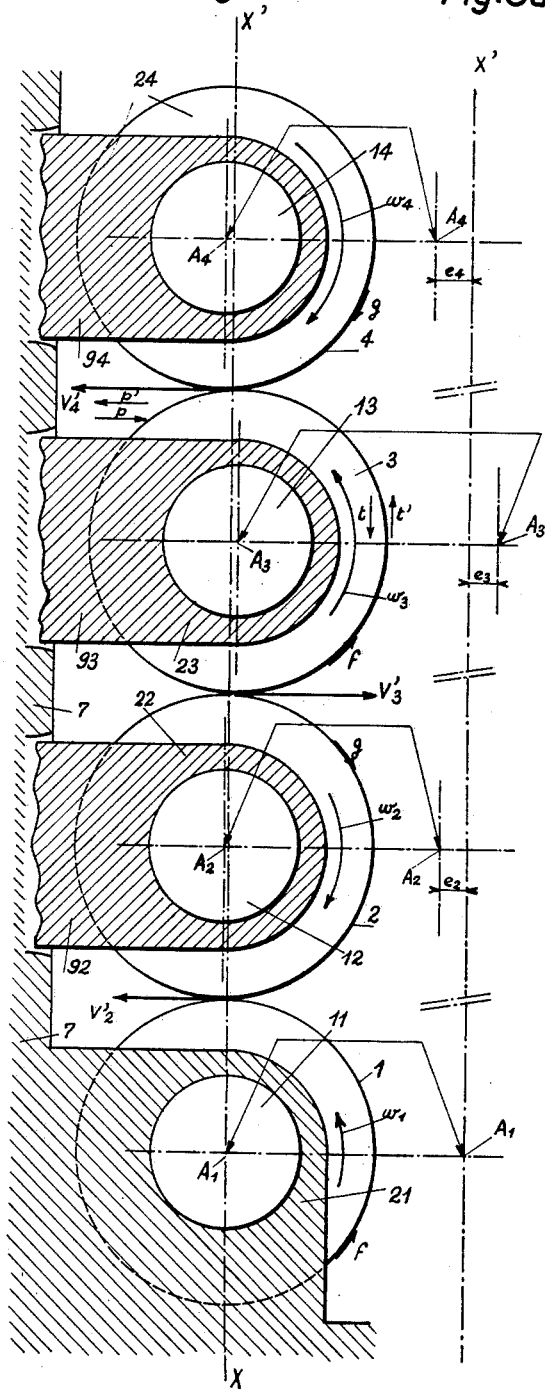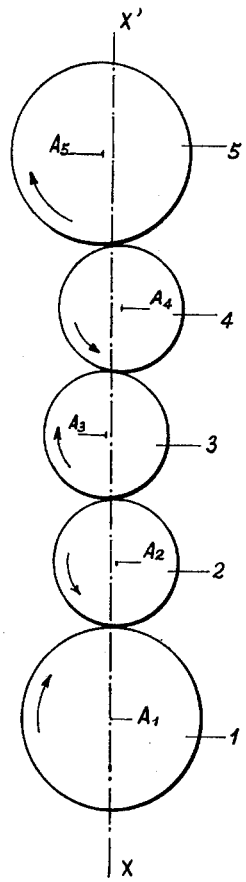

INVENTOR

ANDRE LOUIS VERDIER

By Irwin S. Thompson
ATTY.

Dec. 4, 1962  A. L. VERDIER  3,066,876
ROLLER MILLS, CALENDERS AND LIKE ROLLER MACHINES
Filed Dec. 18, 1959  9 Sheets-Sheet 5

INVENTOR
ANDRE LOUIS VERDIER
By Irwin S. Thompson
ATTY.

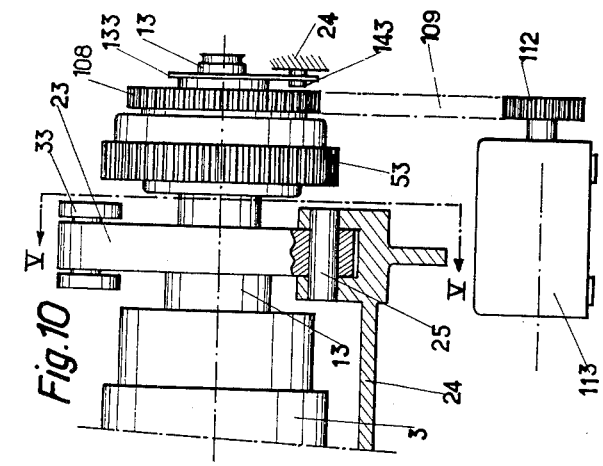
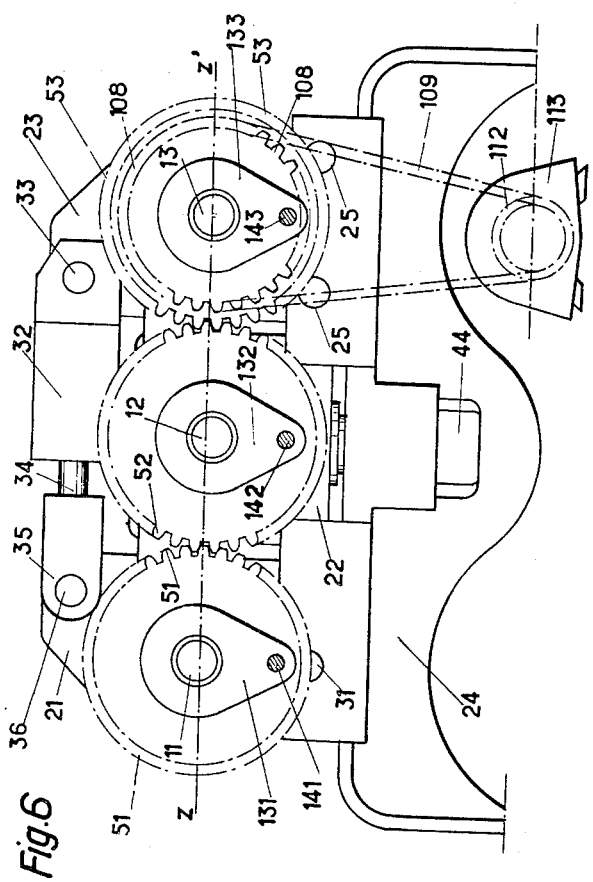
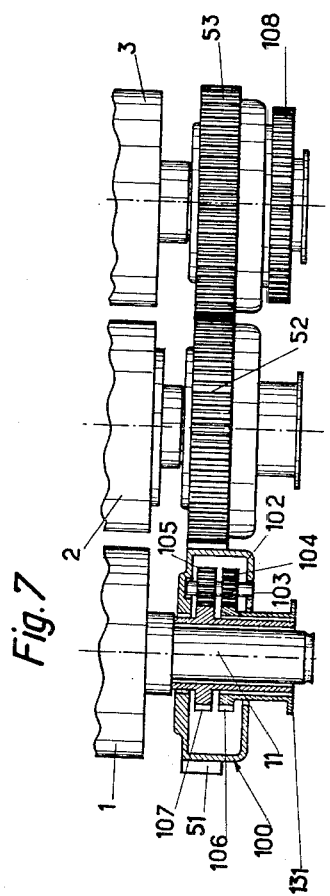

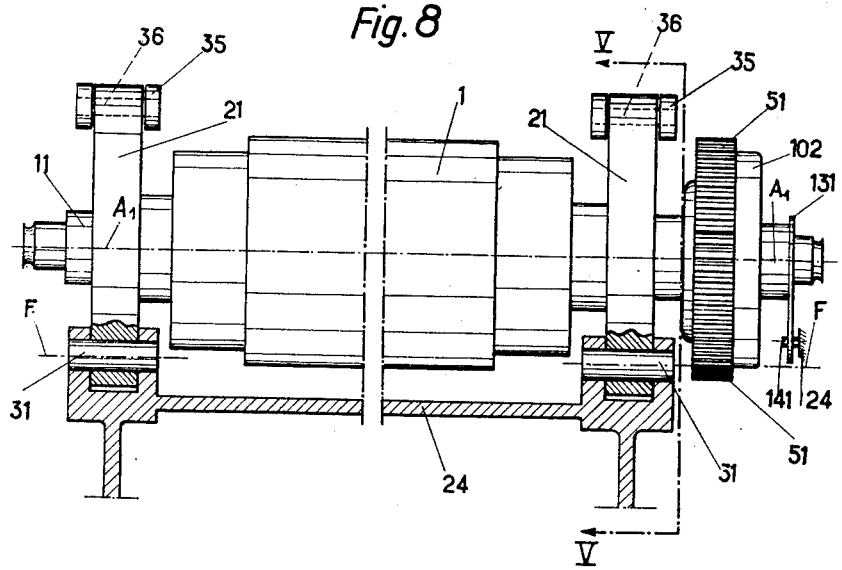
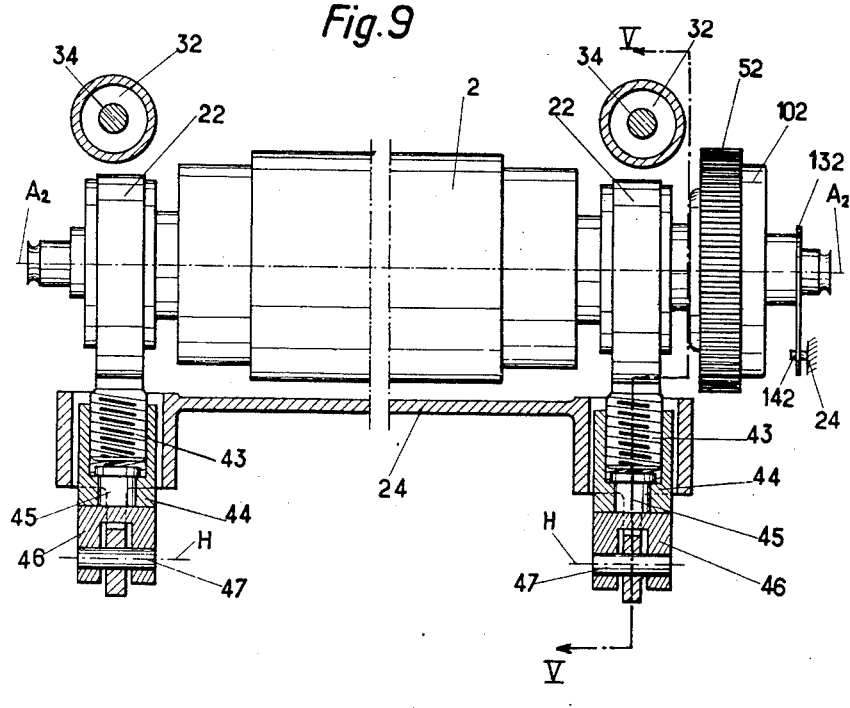

Dec. 4, 1962 A. L. VERDIER 3,066,876
ROLLER MILLS, CALENDERS AND LIKE ROLLER MACHINES
Filed Dec. 18, 1959 9 Sheets-Sheet 8

INVENTOR
ANDRE LOUIS VERDIER
BY Irwin S. Thompson
ATTY.

Dec. 4, 1962  A. L. VERDIER  3,066,876
ROLLER MILLS, CALENDERS AND LIKE ROLLER MACHINES
Filed Dec. 18, 1959  9 Sheets-Sheet 9
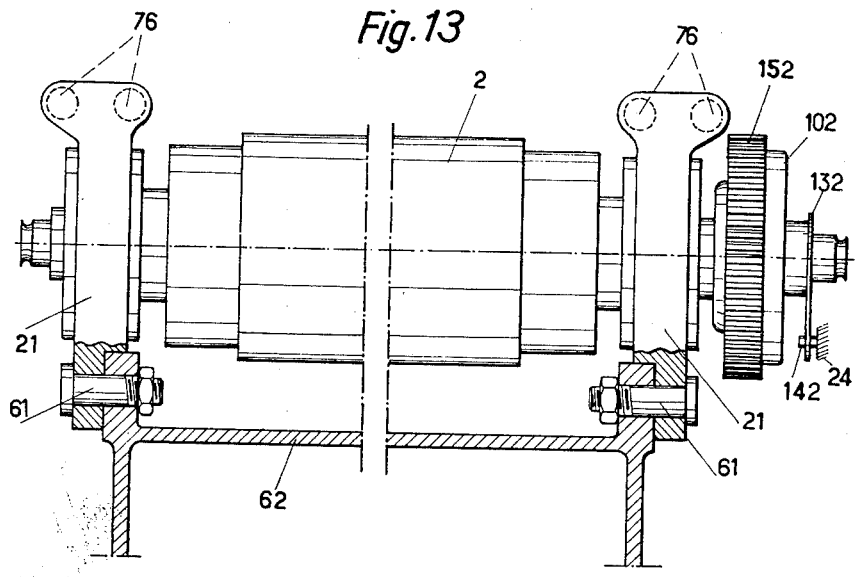
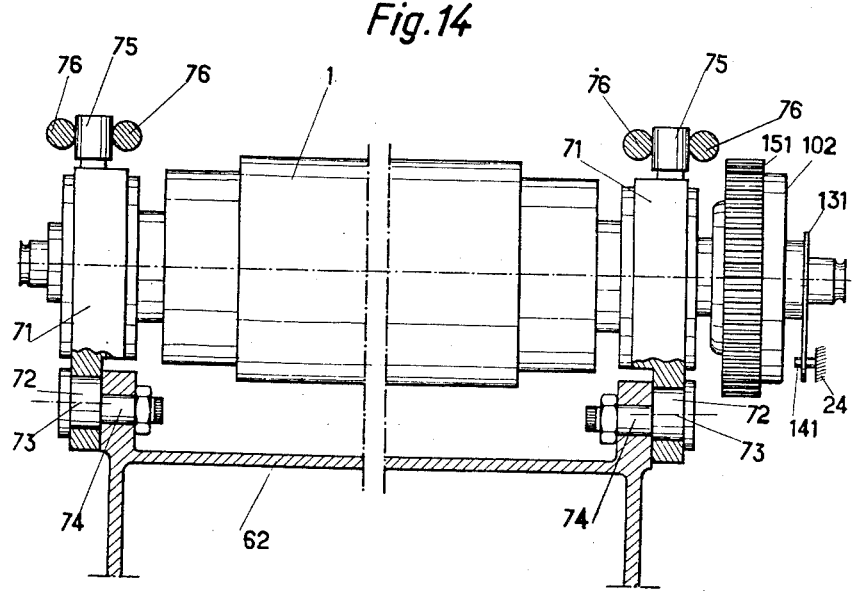
INVENTOR
ANDRE LOUIS VERDIER
BY Irwin S. Thompson
ATTY.

United States Patent Office 3,066,876
Patented Dec. 4, 1962

3,066,876
ROLLER MILLS, CALENDERS AND LIKE ROLLER MACHINES
André Louis Verdier, 6 Ave. Daniel Lesueur, Paris, France
Filed Dec. 18, 1959, Ser. No. 860,494
Claims priority, application France June 28, 1955
6 Claims. (Cl. 241—159)

The present invention concerns improvements relating to roller mills, calenders and like roller machines intended for compressing, mixing, rolling, calendering and other various treatments of this kind, suitable for example in the manufacture of chocolate, rubber, printing inks, paints, soaps, plastics and other materials.

This application is a continuation-in-part of the previous application Ser. No. 547,724 filed on November 18, 1955 by the same applicant and is now abandoned.

In the roller mills, calenders and like roller machines (generally hereinafter referred to as "roller mills") it is known that owing to high compression forces involved, it is necessary to use bulged rollers (i.e. rollers having a diameter larger in the central part of the roller than in its end parts at the neighbourhood of the trunnions).

For example, it is known to use rollers having a difference of 20/100 millimeters in diameter between the end parts and the central part, in the case of rollers having a length twice of the diameter (600 millimeters/300 millimeters), and 30/100 millimeters if the rollers have a length of 1 meter.

The rollers are so bulged in order to maintain them in contact along their generatrices in spite of the flexion of their axes, which is caused by the compression forces. But the manufacture of such bulged rollers is very difficult and therefore very expensive.

It is known also with bulged rollers or with cylindrical rollers to angularly offset the axes of the consecutive rollers so as to compensate the flexion and permit a sufficient longitudinal contact between the adjacent rollers.

But in all cases it occurs considerable stresses in the trunnions of the rollers, with risks of breaking and these internal elastic deformations of the steel of the rollers and trunnions cause an immoderate consumption of energy.

Furthermore the deformation of the rollers when operated necessitates to maintain a certain ratio (substantially of 2) between the effective length of a roller and its diameter.

One of the purposes of the invention is to obviate the hereinbefore mentioned drawbacks, by making possible the use of very weakly bulged rollers or even not bulged at all, the use of rollers having an increased length/diameter ratio and by reducing the deformation and flexion work of the rollers when the machine is operated.

The invention concerns roller mills, calenders and like machine of the kind having a frame, at least a spread of three consecutive rollers with parallel axes rotatably fitted on said frame (the first roller and the last roller being hereinafter referred to as the extreme rollers and the other roller or rollers as the intermediate roller or rollers), means for rotating said rollers in directions and at speeds such that they roll with friction one against another, said speeds increasing from one of said extreme rollers to the other one and said machine further comprising means to press said rollers one against another.

The invention is based on the discovery that for a machine of the above kind, by imparting definite arrangements to the relative disposition of the rollers, it is possible to bring out the following surprising effect: a group of three consecutive rollers becomes self-compressing.

According to the invention, for a group of three rollers having parallel axes and comprising two extreme rollers and an intermediate roller, the axis of the intermediate roller is offset relatively to the plane passing through the axes of the extreme rollers, said offset being made relatively to said plane substantially perpendicularly thereto and in the direction indicated by the peripheral velocity of said intermediate roller at its points of contact with the slowest one of said extreme rollers, said offset being of a small magnitude as respect to the diameters of said rollers.

Preferably the magnitude of the offsetting does not substantially exceed the magnitude for which the resultant of the tangential reactions undergone by said intermediate roller becomes smaller than the resultant of the pressure forces on the same roller.

This offset provided for the intermediate roller is responsible for the reasons that will be hereinafter exposed, of forces which urge this intermediate roller between both adjacent rollers, hereby generating the self-compressing effect.

For a wanted rate of self-compression for a group of three consecutive rollers, the magnitude of the offset depends upon the absolute and relative peripheral velocities of the rollers and upon the nature of the material to be crushed, ground or calendered, particularly upon its viscosity and adherence on the surface of the rollers.

In most cases, the magnitude of the offset of the intermediate roller does not exceed about 10% of the diameter of the rollers.

For reasons that will be hereinafter exposed, the smaller is the magnitude of the offset and the bigger is the magnitude of the forces that urge the intermediate roller between both adjacent rollers, and hence the bigger is the self-compressing effect.

In the more specific case of a machine having at least three rollers, with parallel axes, the axis of the slowest one of the extreme rollers being rigidly fixed to the frame, said machine further having means provided for a transversal displacement of the axes of the other rollers parallelly to themselves and permitting to bring them into a common diametral plane, known as a reference plane and passing through said fixed axis of said extreme roller, the conditions for the directions and speeds of rotation of the rollers being the same as before, it is possible to give another definition of the invention, which is technically equivalent to the precedent one. In this case the machine is characterized in that the axes of the displaceable rollers are alternately offset in opposite directions relating to said reference plane, said offset having a small value relating to the diameter of the rollers and being for each roller in the same direction as its circumferential speed at its points of contact with the next adjacent slower roller.

This definition applies particularly to a machine having at least four rollers or more.

In any case, the spacing of the rollers according to the conditions specified provides a very interesting self-compressing effect, which is obtained for the whole spread of the rollers, whatever the number of rollers involved.

For reasons that will be explained later, in a machine having offset roller (or rollers) spaced according to the invention, the self-compressing effect exerted by the friction forces of the offset roller (or rollers) is opposed to the deformation by flexion of the same roller resulting from the pressure forces developed by the means to press the rollers one against another.

The deformation by flexion may thus be highly reduced even cancelled. All overstrain of the trunnions of the rollers, and of the rollers themselves is then greatly reduced. For a given production and fineness the driving power may be decreased. Another result is a lightening of the machine and a lowering of its cost.

Besides, it will be clear that while the above defined offset tends to maintain in closed contact all along each other the adjacent rotating surfaces of two consecutive rollers, the necessary gap provided between said surfaces for the flow of material to be ground or calendered may be kept itself substantially constant (even if non-bulged rollers are used), which is an important feature for the quality of the grinding.

Obviously it is known to construct roller mills or other machines in which the axes of rollers are not all in the same plane. However in the known machines the offset adopted has not for its purpose to create a self-compression. Besides as this offset has generally a very important magnitude and as its direction does not fullfil the explained conditions, the self-compressing effect does not take place. Other features of the invention will result from the following description.

In the annexed drawings given as non limitative examples:

FIG. 1a is a detailed diagram at a greater scale corresponding to FIG. 1.

FIG. 3 is an explanatory diagram analogous to FIG. 1 of a particular roller mill with four rollers, arranged according to the invention.

FIG. 3a is a detailed diagram at a greater scale corresponding to FIG. 3.

FIGS. 5 to 10 show an industrial embodiment of a three-roller mill arranged in conformity with the invention.

FIG. 5 is a lateral elevation view with removed parts and a section according to V—V of FIGS. 8, 9 and 10.

FIG. 6 is an elevation end side view of the same machine.

FIG. 7 is a partial plane-view with parts broken away and other parts in section.

FIG. 8 is an elevation view of one of the extreme rollers with sections at the level of bearings.

FIG. 9 shows similarly the intermediate roller.

FIG. 10 is an analogous view of the other extreme roller with parts broken away.

FIG. 13 is a view with oblique projection and with partial axial section of one of the intermediate rollers.

FIG. 14 shows in the same manner one of the extreme rollers.

FIG. 15 is a simplified diagram of an other roller mill comprising five rollers.

The characteristic feature of the invention will now be disclosed in reference to the drawings in two cases, the mechanical parts of the machines being all at once very much summarized for sake of clearness.

The first case (FIGS. 1, 1a and 2) concerns a group of three consecutive rollers belonging to a roller mill or similar machine. The second case (FIGS. 3, 3a and 4) pertains to a roller mill of a more specific structure having at least four rollers. The operation is explained in each case.

Afterwards are disclosed specific examples of roller mills provided with mechanical means for an easy performance of the improvements provided by the invention.

Figure 1:
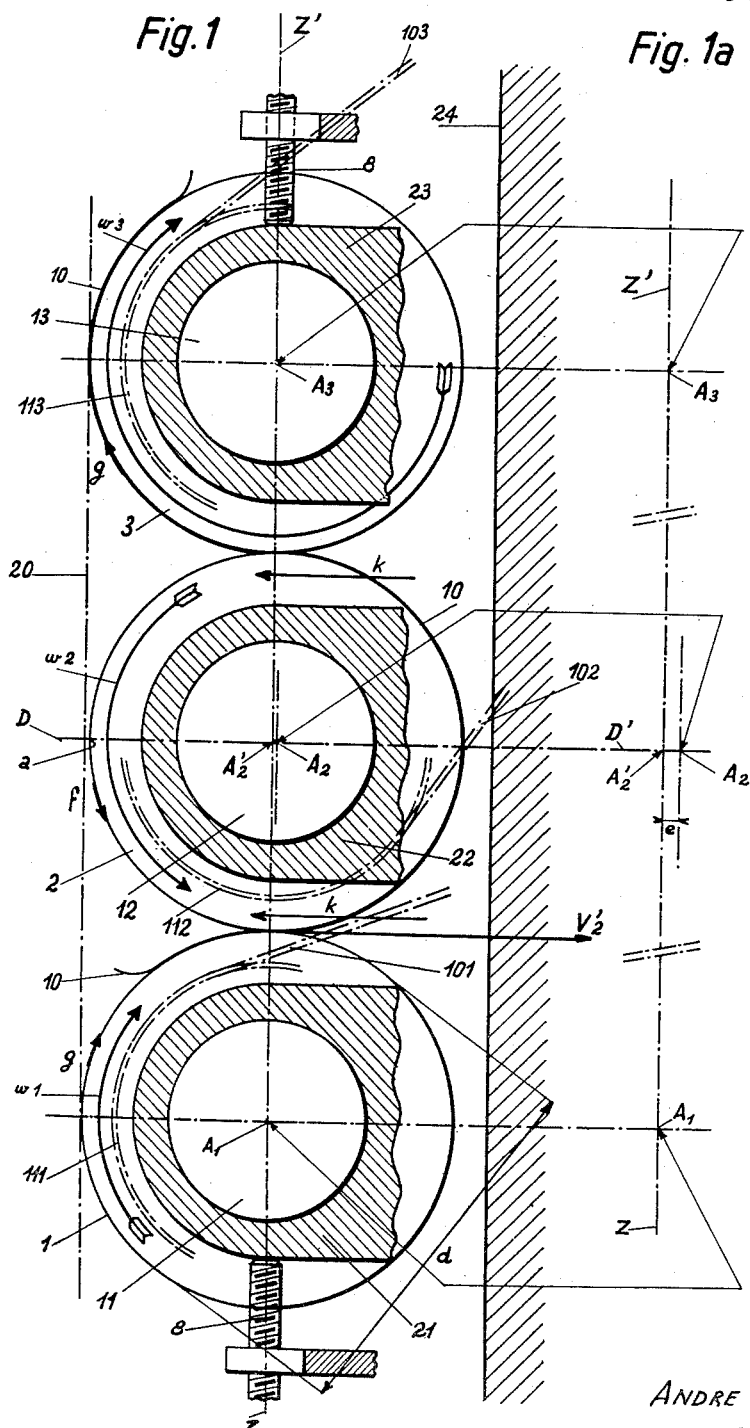
FIG. 1 is an explanatory diagram showing by a lateral view three consecutive rollers of a roller mill arranged according to the invention.

In FIG. 1 are shown three consecutive rollers 1, 2, 3 of a machine arranged according to the invention. These rollers of which axes $A_1$, $A_2$, $A_3$ are parallel, are provided with lateral trunnions 11, 12, 13 rotatably mounted within bearings 21, 22, 23, said bearings being carried by a frame 24.

Transmission elements such as driving chains 101, 102, 103 in mesh with gears 111, 112, 113 impart to the rollers 1, 2, 3 rotation movements in alternate directions $g$, $f$ and $g$ respectively (i.e. two consecutive rollers have opposite directions of rotation).

The speeds of the driving chains 101, 102, 103 are also such that the angular rotating speeds $w_1$, $w_2$, $w_3$ of the group of rollers considered have increased given values from the extreme roller 1 to the other extreme roller 3 (i.e. the speeds $w_1$, $w_2$, $w_3$ are staggered $w_2$ being larger than $w_1$ and $w_3$ larger than $w_2$).

In other words, the driving means of the machine are such that the rollers roll with friction one against another.

On FIG. 1 where the outer diameter $d$ of the rollers is assumed to be equal to 300 millimeters, the angular rotating speeds of the rollers 1, 2 and 3 are respectively assumed to be 180, 250 and 480 revolutions per minute and the vectors $w_1$, $w_2$ and $w_3$ are drawn at a scale of 1 degree of angle per 2 revolutions per minute.

The machines still comprise squeezing means or means to press the rollers one against another diagrammatically shown in 8, acting on the bearings 21, 23 of the extreme rollers and urging these bearings one towards the other.

According to the invention, in a machine of this kind, the axis $A_2$ of the intermediate roller 2 is offset relatively to the plane Z—Z' passing through the axes $A_1$, $A_3$ of the two adjacent rollers 1, 3, which are the extreme rollers of the group of three rollers considered.

This offset is made in a direction D—D' substantially perpendicular to said plane Z—Z' and relatively to said plane in the direction indicated by the peripheral velocity $V_2$ of the roller 2 at its points of contact with the roller 1 which is the slower one of both.

On the other hand the offset may be made adjustable in value by means of devices ensuring a transversal displacement of the bearings 22 relatively to the plane Z—Z' and in direction substantially perpendicular thereto. Examples of such devices will be given later. In that case the machine is suitable for grinding various kinds of substances.

The magnitude $e$ (FIG. 1a) of the offset of the axis $A_2$ of the intermediate roller 2 relatively to the plane Z—Z' which is expressed by the distance $A_2$—$A'_2$ is also equal to the distance between the common tangent plane 20 to rollers 1 and 3 and the periphery of the roller 2 (point $a$). It is thus possible to ascertain by a direct measurement this offset by applying a rigid rule 20 in contact with both rollers 1 and 3, thereby materializing said common tangent plane thereto and by measuring the distance between the rule 20 and the point $a$ of the roller 2 by any convenient means such as blocks of standard thickness or micrometers.

According to the invention, the magnitude of the offset $e$ is always small relatively to the diameter of the rollers and does not exceed 10% of this diameter (for example 30 millimeters if the value of diameter of rollers is 300 millimeters).

If the offset remains within said limits a valuable self-compression effect may be developed within the rollers, i.e. roller 2 tends to engage itself between rollers 1 and 3 in the direction of arrows $k$ hereby tending to reduce the magnitude of the offset $e$. This self-compression effect is the result of various dynamic actions exerted on the said roller 2, when the machine is operated, a thin film of paste or ground product 10, having certain viscosity and adherence being carried by the outer surface of the successive rollers and passing therebetween, with subsequent grinding and laminating.

All other things remaining constant, the tendency of self-engagement for the roller 2 is a decreasing function of the magnitude $e$ of the offset. It becomes rather quickly unperceptible, whereas it is the more important, the more the magnitude $e$ diminishes, $e$ being however kept different from zero.

On the other hand, for a constant offset, the self-compressing effect increases with the friction between the rollers, i.e. with the difference of the peripheral velocities of the rollers at their points of contact.

The self-compressing effect still depends upon the nature of the product to be ground. For a given offset, the more the product is viscous and adhesive and the more the self-compressing effect is important.

From the foregoing, it is clear for those skilled in the art that in each particular case the magnitude of the offset and frictions are set, taking into account the nature of the product to be ground, according to the conditions of operation which are considered as the most desirable for the machine (e.g. maximum output, maximum fineness, minimum power required or a compromise between these various conditions).

For the reasons above set forth, it is not possible to fix the magnitude of the offset corresponding to the best operative conditions for the machine, the maximum practical magnitude having been however indicated. In each particular case, the ascertainment of the optimum magnitude is rather a matter of routine.

The following indications may however be given: if the magnitude of the offset for the intermediate roller is too large, the thickness of the layer of ground product is bigger in the central part of the rollers than in the terminal part owing to the flexion of this roller. On the other hand, if the offset is too small, the reverse effect is obtained. For the convenient offset, the thickness of the layer of ground product is the same all along the rollers. This phenomenon makes it possible to ascertain the boundaries of the range of offset practically available. This range is generally very narrow (a few millimeters for example) and within this range the machine may be considered as being correctly set.

The following numeral examples are illustrative of the various adjustments which it is possible to perform within the scope of the invention:

Length of rollers: 800 millimeters; diameter, 300 millimeters. Roller's bulging (in hundredths of millimeter): roller 1: 6; roller 2: 0; roller 3: 3.

| Nature of the product to be ground | Velocities (in revolutions per minute), roller | | | Offset of roller 2 $e$ (millimeters) |
| --- | --- | --- | --- | --- |
| | 1 | 2 | 3 | |
| Black printing ink for newspapers (very fluid) | 180 | 250 | 480 | 3 |
| Quick drying black printing ink | 180 | 245 | 480 | 2 |
| Offset printing yellow ink | 40 | 100 | 200 | 8 |
| White printing ink with an alumina sulphate base | 65 | 123 | 246 | 5 |
| Chrome glycerophthalic yellow lack for oven drying | 95 | 123 | 246 | 16 |
| Ground white pigment within linseed oil | 180 | 250 | 480 | 11 |
| Paste of plastified polyvinyl chloride | 180 | 250 | 480 | 6.5 |

The task of determining the dynamic conditions of equilibrium of the rollers in a machine spaced according to the invention constitute a rather difficult problem due to the complexity of the actions and reactions developed when the machine is operated, the frictions between two adjacent rollers being exerted through a more or less sticky or adhesive medium of various nature and viscosity and the rollers being not undeformable solids.

Figure 2:
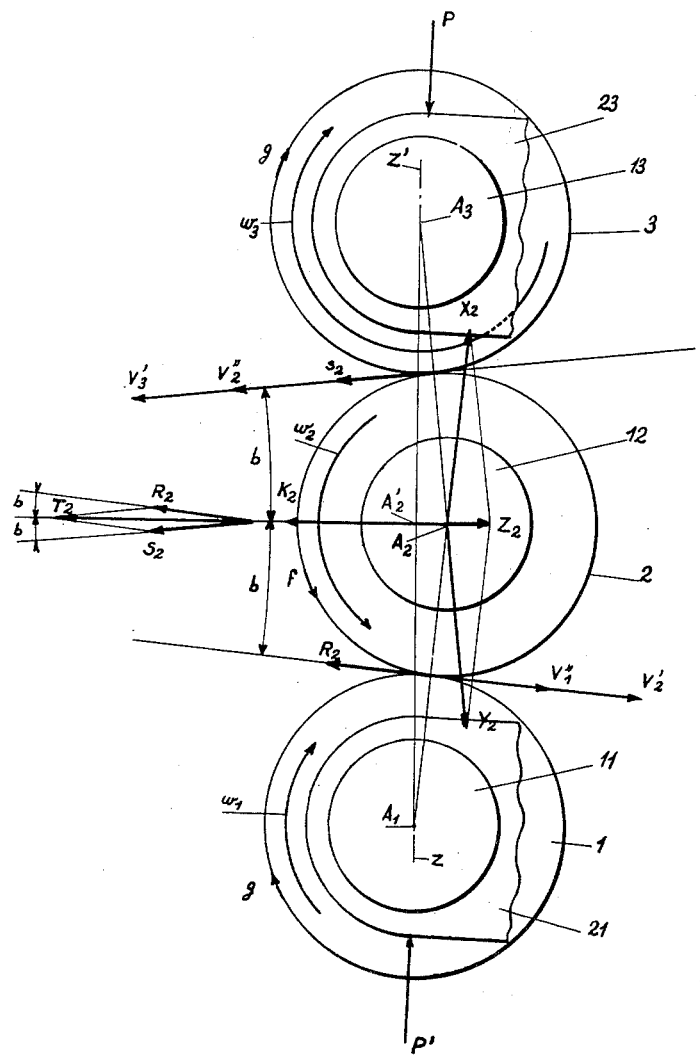
FIG. 2 is an explanatory diagram of forces, corresponding to FIG. 1, the transverse offset being exaggerated for sake of clearness.

However it is possible to give a simplified explanation of the reasons of the self-compressing effect, referring now to FIG. 2, where the offset of the rollers has been exaggerated for sake of clearness.

In FIG. 2, P and P′ show diagrammatically the forces exerted on bearings 21, 23 of the extreme rollers 1 and 3, by the squeezing means.

On the other hand, $V''_1$ represents the peripheral velocity of roller 1 at its points of contact with roller 2, $V'_2$ is the peripheral velocity of roller 2 at the same points, $V''_2$ and $V'_3$ are the peripheral velocities of rollers 2 and 3 in their points of contact.

Owing to the friction exerted by roller 2 on roller 1 and to the friction produced by roller 3 on roller 2 in consequence of differences existing between peripheral velocities the roller 2 is subjected to tangential reactions represented in $R_2$ and $S_2$ which are assumed to be substantially equal. Both forces have for resultant $T_2$ in the direction of the bisector of angle $2b$ formed by the tangents to roller 2 at its points of contact with rollers 1 and 3 (jamming angle).

Besides roller 2 undergoes from rollers 1 and 3 compressing forces $X_2$, $Y_2$ directed substantially along $A_1$, $A_2$ and $A_3$, $A_2$. These forces which are caused by the actions P, P′ exerted on the bearings 21, 23 to press the rollers one against another, have a resultant $Z_2$ opposed to $T_2$.

From FIG. 2 result the following equations:

$$T_2 = 2R_2 \cos b$$
$$Z_2 = 2X_2 \sin b$$

As the offset $e$ of roller 2 is small, angle $2b$ is very small (at most a few degrees). Consequently the resultant $Z_2$ of tightening actions is very small and this resultant tends to clear roller 2 out of rollers 2 and 3 and to bend its axis.

On the contrary the resultant $T_2$ of tangential reactions is important and may notably exceed $Z_2$. The difference of forces $T_2$ and $Z_2$ is a force $K_2$ in the same direction as $T_2$ and tending to engage roller 2 between rollers 1 and 3 and pushing back these latter rollers. This force $K_2$ produces the self tightening or self-compressing effect referred to.

The force $K_2$ may be considered as the resultant, applied in middle of axis $A_2$, of all elementary parallel actions exerted in the same direction on the roller 2.

It will be seen that if the offset $e$ is increased $Z_2$ becomes greater and $T_2$ diminishes, $K_2$ is then reduced so as the self-compressing effect. For a certain value $e_0$ of the offset $T_2 = Z_2$ and the self-compressing effect ceases.

If the offset increases more, $Z_2$ exceeds $T_2$ and the median roller 2 undergoes a bending on the length of its axis.

The offset $e_0$ for which $T_2 = Z_2$ is considered as the limit of the scope covered by the invention.

Owing to the technical effect which has been pointed out hereinbefore, the invention permits a reduction of bulge in the extreme rollers and a complete suppression of bulge in the median roller.

In the case of a machine having more than three rollers, it is possible to consider the successive groups of three consecutive rollers.

However another definition of the invention may be given when the machine comprises, as shown on FIG. 3, an extreme roller 1 of which the trunnions are mounted in a bearing 21, which is stationary relatively to the frame, while the following rollers 2, 3, 4 are mounted in bearings 22, 23, 24 the position of which is adjustable with respect of said frame, and it is understood as previously, that the angular velocities $w_1$, $w_2$, $w_3$, $w_4$ of the rollers are staggered and have alternate directions, the roller 1 further being the slowest one.

It will be observed that in this example, the roller 1 rotates in direction $f$, roller 2 in direction $g$, roller 3 in direction $f$ and so on.

The bearings 22, 23, 24 are arranged in such a manner that the axes $A_2$, $A_3$, $A_4$ of corresponding rollers 2, 3, 4 may be brought into a common diametral plane X—X′ containing the stationary axis $A_1$ of roller 1. This plane known as reference plane is fixed relatively to the frame.

The means used to adjust relatively to the frame 7 the positions of axes of intermediate rollers 2, 3, 4 are diagrammatically shown in 92, 93, 94. They permit both a displacement of these axes according to the directions $p, p'$ substantially perpendicular to the plane X—X' and a small vertical play in directions $t, t'$ this play being necessary to permit the mutual contact of the rollers in spite of their transverse offset which causes a vertical variation of their axes.

Examples of adjusting means permitting this double displacement $p, p'$ and $t, t'$ will be described later.

According to the invention, the axes $A_2, A_3, A_4$ are alternately offset in opposed directions relatively to the reference plane X—X'. This offset is small relatively to the diameter of rollers and for each roller the offset takes place in the direction indicated by the peripheral velocity of the considered roller at its points of contact with the adjacent roller which is slower.

For instance, the axis $A_2$ of roller 2 is offset relatively to plane X—X' in the direction shown by the velocity $V'_2$. Similarly for the axis $A_3$ the offset takes place in the direction of velocity $V'_3$ and for $A_4$ in the direction of $V'_4$.

The axes of transversely displaceable rollers are located alternatively on one side and on the other one of the reference plane X—X'.

In the described example the offset is small relatively to the diameter of the rollers but it increases with the angular velocity of these rollers.

However it is not compulsory that the magnitude of offset increases with the row of rollers, because this magnitude depends not only on the velocities of rollers and on the frictions but also on viscosity and adherence of the ground product, these both factors being capable of varying between both extreme rollers, due to the successive laminations of this product.

When the adherence of the treated product substantially decreases after each lamination (case of a calendered sheet of plastic material for example), the offset relatively to the reference plane of the fastest roller may thus be smaller than that provided for the second roller of the spread.

The adjustment of positions of axes of rollers is preferably made step by step while considering the successive groups of three rollers 1, 2, 3 then 2, 3, 4 . . . and so on if the machine has more than four rollers.

In this operation, in order to avoid that the adjustment of the group 2, 3, 4, modifies the adjustment of the group 1, 2, 3, it may be advantageous to displace only the axes $A_2, A_4$ of rollers of even row.

In the case of FIGS. 2 and 2a the diameter $d$ of the rollers being 300 millimeters, their length 800 millimeters the bulge being respectively 9, 1, 2 and 9 hundreths of millimeter for rollers 1, 2, 3 and 4, the velocities and offsets $e_1, e_2, e_3$ are as follows:

| Product treated | Angular velocity in revolutions per minute | | | | Offsets in millimeters | | |
|---|---|---|---|---|---|---|---|
| | 1 | 2 | 3 | 4 | $e_1$ | $e_2$ | $e_3$ |
| Chocolate paste with a small percentage of fatty products | 78.7 | 148.5 | 185.5 | 231 | 5.5 | 6.8 | 8.2 |

In other circumstances the following values of offset have been found suitable.

| Product | Velocities in revolutions per minute | | | | Offsets in millimeters | | |
|---|---|---|---|---|---|---|---|
| | 1 | 2 | 3 | 4 | $e_1$ | $e_2$ | $e_3$ |
| Chocolate paste with a high percentage of fatty products | 42 | 90 | 138 | 186 | 1.36 | 2.73 | 4.1 |

In the case of a vertical spread four rollers calender whose rollers have a diameter of 600 millimeters and a length of 1800 millimeters, the following offsets have been successful for calendering a sheet of plastic material

| Roller | Angular velocity (r.p.m.) | Offset (millimeters) |
|---|---|---|
| 1 | 26.3 | |
| 2 | 28.8 | 48 |
| 3 | 31.5 | 27 |
| 4 | 39.5 | 27 |

As previously the limit values of offset may be determined by maintaining to a sheet of ground material a uniform thickness.

Figure 4:
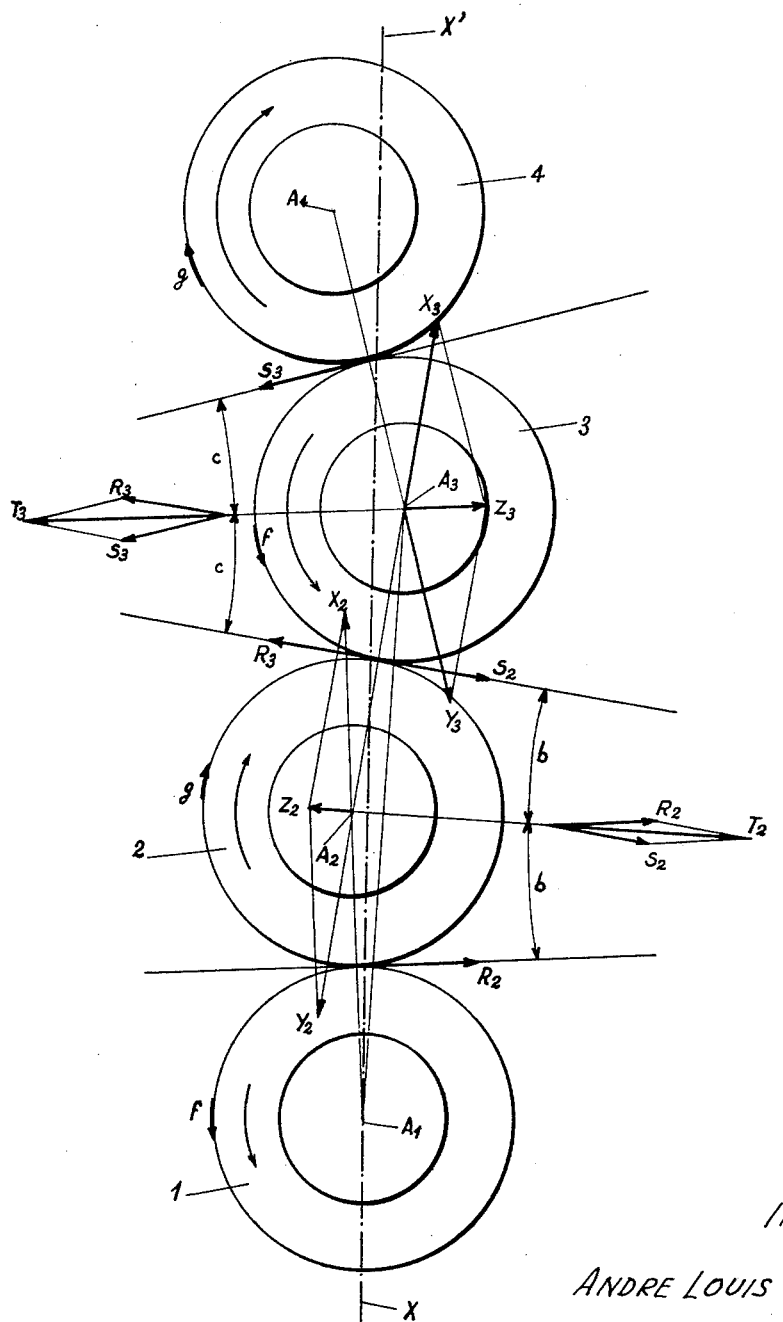
FIG. 4 is an explanatory diagram of forces analogous to FIG. 2, in the case of the four-roller mill of FIG. 3, the offset of axes having been exaggerated for sake of clearness.
Figure 5:
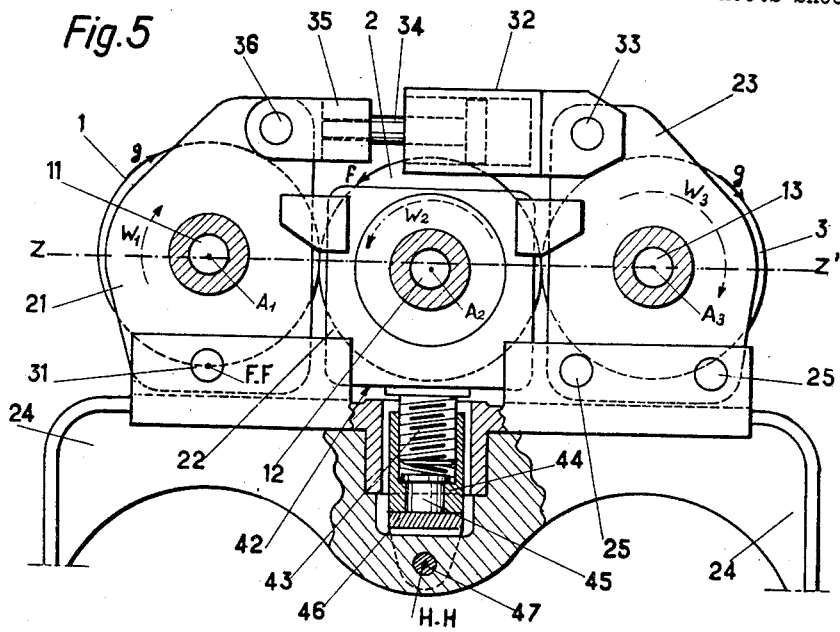

The dynamic equilibrium is represented on FIG. 4 where the offsets have been substantially exaggerated.

The roller 2 is subjected to a tangential reaction $R_2$ owing to its friction on roller 1 and to a tangential reaction $S_2$ owing to the friction of roller 3. Both reactions have a resultant $T_2$ the direction of which is opposed to the resultant $Z_2$ of tightening forces $X_2, Y_2$ which are directed along $A_1, A_2$ and $A_3, A_2$. In accordance with the small offset the resultant $Z_2$ is small and inferior to $T_2$. This latter tends to engage roller 2 between rollers 1 and 3.

Similarly the roller 3 is subjected to friction reactions $R_3$ (opposed to $S_2$) and $S_3$. These forces which make an angle $2c$ have a resultant $T_3$ opposed to the resultant $Z_3$ of the tightening forces $X_3, Y_3$. As $T_3$ is greater than the force $Z_3$ the roller 3 is pressed between rollers 2 and 4.

Thus, the assembly of rollers is self-compressing.

The technical effect produced by the invention may be appreciated by the following data.

A roller mill with five rollers having each a diameter of 360 millimeters and a useful length of 1 meter driven by a motor of 35 hp. and arranged according to the invention permits to obtain the same fineness of grinding and the same output as with a conventional roller mill of which the axes of rollers are coplanar, these rollers having a diameter of 420 millimeters, a useful length of 1 meter and driven by a motor of 50 hp.

Thus, it will be seen that the particular arrangement of rollers in conformity with the invention makes it possible to reduce the diameter of the rollers and the power of the motor, while keeping the same grinding fineness and the same output, or to increase the length of rollers without changing the diameter so as to have a greater output with the same fineness.

As a consequence of the first technical effect, the invention comprises the use of intermediary rollers of which the diameter is inferior to that of the extreme rollers. Such a machine is represented in FIG. 15 where a roller mill with five rollers has two extreme rollers 1 and 5 having a diameter of 360 millimeters and a length of one meter, the intermediate rollers 2, 3, 4 having a diameter of 240 millimeters only and the same length.

In fact as the intermediate rollers are subjected to bending forces smaller than in the ordinary cases, their inertia moment may be reduced without any drawback. Besides as their curvature is greater, the specific grinding pressure may be increased and that is favourable to the fineness.

A way of practical performing of the improvements according to the invention will be now described, at first for roller mills with three rollers then for a roller mill with five rollers.

The roller mill represented in FIGS. 5 to 10 comprises three rollers 1, 2, 3 which rotate in the directions $g, f, g$ respectively. 1 is the slow roller, 3 is the fast roller.

The trunnions 13 of the roller 3 are mounted in bearings 23 rigidly fixed to the frame 24 by pins 25.

The trunnions 11 of the roller 1 are carried by bearings 21 pivoted to the frame 24 by means of short shafts 31.

Driving devices are foreseen for the various rollers. These devices comprise for each roller a differential gear of the epicycloidal type represented at 100 for roller 1. It is understood that the other rollers comprise analogous differential gears.

The differential gear 100 is constituted by a cage 102 rotatably mounted on the trunnion 11 and carrying an external toothed crown 51. The cage 102 contains at least a planetary pinion 103 with two rows of teeth 104, 105 which are in mesh with the two sun-wheels 106, 107. The wheel 106 is borne by a plate 131 fixed on the frame 24 by means of a pin 141 (FIGS. 6 and 8). The wheel 107 is solid with the trunnion 11.

The planetary 103 and the sun wheels 106, 107 are mounted so as to be easily interchangeable and it is thus possible to modify the transmission ratio of the driven roller.

As shown on FIG. 6 the crowns 51, 52, 53 of rollers 1, 2, 3 are in mesh together. The plates 132, 133 and the fastening pins are also represented.

On the cage of the differential disposed on the trunnion 13 of roller 3 is mounted a driving toothed plate 108 connected by a chain 109 to the driving pulley 112 of a motor 113.

The device adjusting the grinding pressure between rollers 1 and 3 is constituted by traction jacks 32 energized by a fluid under pressure. Each of these jacks is pivoted at 33 on the fixed bearing 23 and its sliding rod 34 is attached by means of a fork 35 and of a shaft 36 to the corresponding pivoted bearing 21.

The median roller 2 is mounted so as to have an adjustable offset. Its trunnions 12 are carried by bearings 22 each of them being provided with a fixed threaded rod 43 is mesh (FIG. 9), with a nut 44 rotatable about a pivot 45 mounted on a fork 46. Each of the forks 46 is rotatably mounted on the frame 24 by means of a short shaft 47.

It is to be remarked that owing to the mounting adopted, the Axis $A_1$, $A_1$ of roller 1 is able to rotate at a constant distance about the axis F, F of its bearings and the axis $A_2$, $A_2$ of the median roller 2 is able to rotate at an adjustable distance about the axis H—H of forks 46.

The offset of the axis of the intermediate roller 2 is measured in respect of plane Z—Z' which contains the axes $A_1$—$A_1$ of roller 1 and $A_3$—$A_3$ of roller 3.

The adjustment of the transverse offset of roller 2 is made in rotating the nuts 44 around their pivots 45, so as to modify the distance of axes $A_2$—$A_2$ and H—H. Owing to demultiplication obtained by the screws 43 and the nuts 44, it is possible to adjust accurately the offset to a very small value.

The desired grinding pressure is obtained by shortening the jack 32, which pushes the roller 1 against the roller 2 and this latter against the roller 3.

When the motor 113 is started the rotation of plate 108 causes that of crowns 51, 52, 53 which rotate at the same velocity. However as the transmission ratio of differential gears such as 100 are different, the rollers 1, 2, 3 rotate at staggered velocities, these velocities increasing from roller 1 to roller 3.

Figure 11:
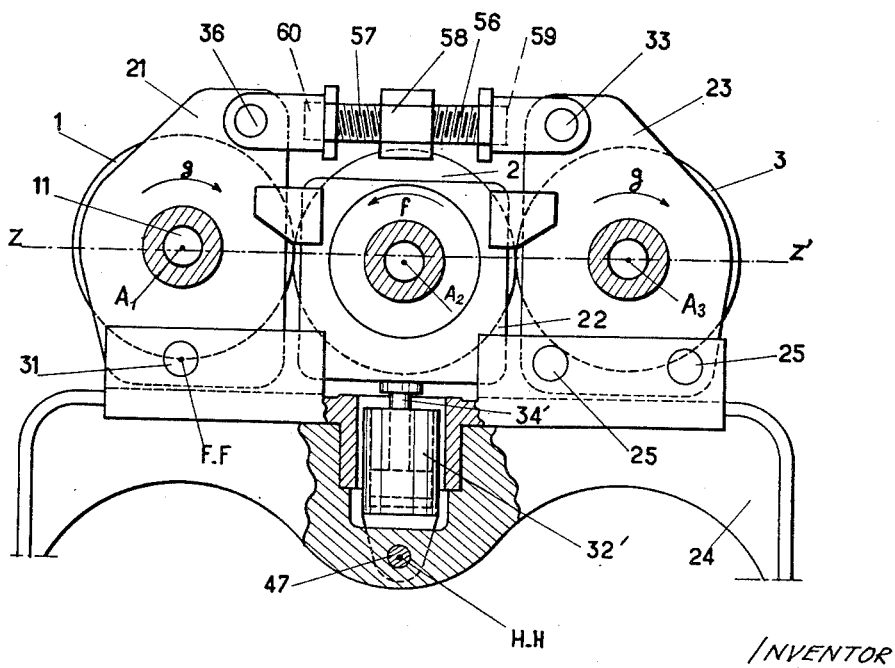
FIG. 11 is a side elevation view analogous to FIG. 5 and showing another three roller mill according to the invention.

The roller mill with three rollers of FIG. 11 belongs to the type in which the setting of the offset of the intermediate roller 2 is obtained by a variation of the distance between the outer rollers 1 and 3. This offset is measured relatively to the reference plane Z—Z' which contains the axes $A_1$—$A_1$ and $A_3$—$A_3$ of extreme rollers 1 and 3. The slow roller is roller 1.

As a difference from the preceding machine, the means to press the rollers one against another are constituted by a jack 32' of which the rod 34' is connected to the bearings 22 of the median roller 2. The body of the jack 32' is pivoted on a shaft 47 of the frame 24. The jack 32' is energized by a fluid under pressure.

The device permitting to adjust the offset of axis $A_2$—$A_2$ comprises a screw with two opposed threads 56, 57 and an actuating nut 58, the threads 56, 57 being respectively engaged in the nuts 59, 60 pivoted about axes 33, 36 of bearings 23, 21.

The jack 32' being shortened as much as possible, so as to bring down the roller 2, it is clear that any action on nut 58 modifies the position of axes 33, 36 owing to the rotation of bearings 21 around their axes 31. This displacement modifies the distance between the axes $A_1$—$A_1$ and $A_3$—$A_3$ of rollers 1 and 3.

The tightening pressure is obtained by lengthening the jack 32' which pushes the roller 2 as a wedge between rollers 1 and 3. Simultaneously the magnitude of offset of axis $A_2$—$A_2$ in respect of the plane Z—Z' is thus defined.

Figure 12:
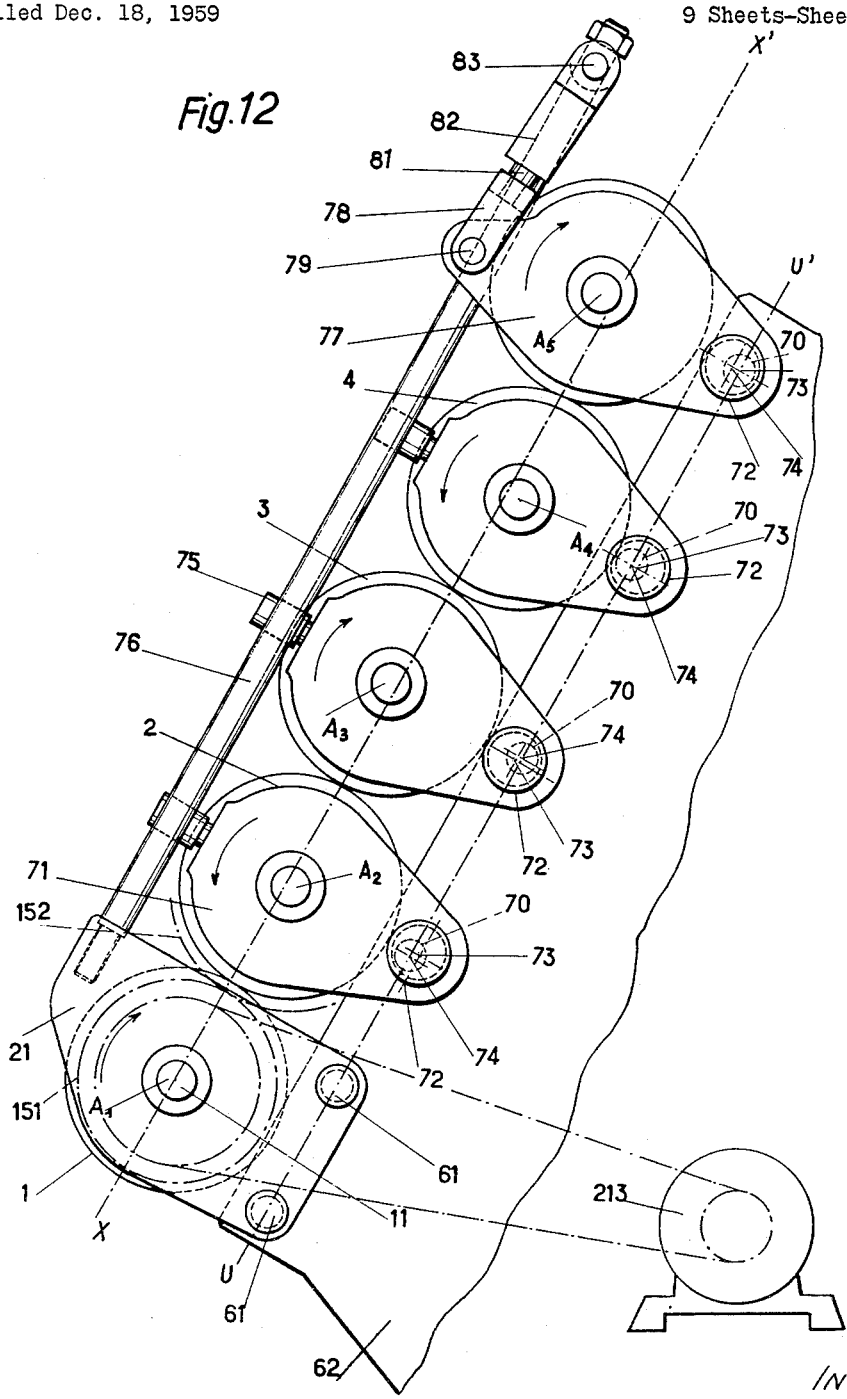
FIG. 12 is an elevation side view of a five roller mill arranged according to the invention.

The machine of FIGS. 12 to 14 shows the applications of the invention to a machine in which the axes of the intermediate rollers and also the axis of one of the extreme rollers may receive an adjustable offset relatively to the frame. The other extreme roller which is also the slowest one, has its axis in a fixed position relatively to the frame.

In these conditions, the offset of the axis of rollers is advantageously measured relatively to a reference plane constituted by the common diametral plane of all rollers if there was no offset.

In this example the machine comprises five rollers, but it is understood that the device used for adjusting the offset of rollers and the pressure of the same would be also applicable in case of a machine having a different number of rollers, for instance 4 or 7.

In the machine of FIGS. 12 to 14 comprising five rollers 1, 2, 3, 4, 5, the axis of the slow roller 1 is fixed the trunnions 11 being borne by bearings 21 maintained by pins 61 on frame 62.

The axes of rollers 2 to 5 are pivoted relatively to frame 62. For this purpose they are rotatably mounted on discs 72 whose centers are shown in 73. The discs 72 are solid with studs 70 rotatably fitted on the frame 62 but whose fixed centers are at certain distance of the centers 73 of those discs. In other words the bearings 71 are linked to the frame 62 by means of eccentric wheels. The centers 74 are in the plane U—U' which is fixed relatively to the frame 62.

At their front part, the bearings 71 of rollers 2 to 4 bear rotating naves 75 which lean on guiding bars 76 which are parallel and mounted on bearings 21.

The extreme roller 5 bears at the end of each of the bearings 77 a fork 78 pivoted by means of a shaft 79. These forks are attached to pistons 81 of the jacks 82 which are pivoted on transverse bars 83 fixed to the guiding bars 76.

Actuating means are provided to drive each roller. These means comprise as previously a motor 213 which drives a crown 151 on roller 1 with a differential gear incorporated, this crown 151 being in mesh with a crown 152 and so on for the other rollers (the crowns of these rollers having not been represented by sake of clearness). The use of jacks 82, by means of which the rods 76 work in extension, ensures the mutual tightening of rollers. This tightening may be adjusted by modifying the feeding pressure of jacks 82.

The adjustment of the axes of rollers 2 to 5, relatively to the reference plane X—X' which is parallel to the plane U—U' is obtained by angularly displacing studs 74 of eccentric discs 72 so as to modify the position of the centers 73 in respect to the plane U—U'.

The axes of rollers 2 to 5 are offset successively on both sides of the reference plane X—X' passing through $A_1$ (this plane X—X' being the common diametral plane when these axes are not offset).

The offset has a small value comparatively with the diameter of rollers and must not exceed 10% of this diameter.

What I claim is:

1. A roller mill, calender and the like roller machine intended for the treatment of noncoherent matters, said machine having a frame, a spread of at least three consecutive rollers with parallel axes rotatably fitted on said frame, the first and last rollers being known as extreme rollers and the other roller as intermediate roller and the axes of said extreme rollers being in the same plane, means for positively rotating each of said rollers at a given peripheral velocity corresponding to a given speed, with said speeds having alternate directions for the rollers of said spread and said given velocity having substantially increased values from one of said extreme rollers to the other one, means for separately adjusting for each of said rollers the peripheral velocity imparted by said rotating means, means to press said rollers one against another and means to adjust said pressing means, means to offset said intermediate roller in a direction substantially perpendicular to said plane and in the same sense as the peripheral velocity of said intermediate roller at its points of contact with the slowest one of said extreme rollers, and means controlling said offsetting means for adjusting said offset of said intermediate roller to a small magnitude relatively to the diameter of said rollers, said magnitude not exceeding 10% of said diameter.

2. A roller mill, calender and the like roller machine intended for the treatment of noncoherent matters, said machine having a frame, a spread of at least three consecutive rollers with parallel axes rotatably fitted on said frame, the first and last rollers being known as extreme rollers and the other roller as intermediate roller and the axes of said extreme rollers being in the same plane, means for positively rotating each of said rollers at a given peripheral velocity corresponding to a given speed, with said speeds having alternate directions for the rollers of said spread and said given velocity having substantially increased values from one of said extreme rollers to the other one, means for separately adjusting for each of said rollers the peripheral velocity imparted by said rotating means, tangential reactions being thus exerted by said extreme rollers on said intermediate roller, said reactions having a resultant substantially perpendicular to said plane, adjustable means to press said rollers one against another, means to offset said intermediate roller in a direction substantially perpendicular to said plane, said intermediate roller being offset relatively to said plane in the same sense as its peripheral velocity at its points of contact with the slowest one of said extreme rollers, and subjected to compressing forces having a resultant substantially perpendicular to said plane, and means controlling said offsetting means for adjusting said offset of said intermediate roller to a small magnitude relatively to the diameter of said rollers and not exceeding a limit value beyond which said resultant of said tangential reactions becomes smaller than said resultant of said compressing forces.

3. A roller mill, calender and the like roller machine intended for the treatment of noncoherent matters, said machine having a frame, a spread of at least three consecutive rollers with parallel axes rotatably fitted on said frame, the first and last rollers being known as extreme rollers, means for positively rotating each of said rollers of said spread at a given peripheral velocity corresponding to a given speed, with said speeds having alternate directions for the rollers of said spread and said given velocity having substantially increased values from one of said extreme rollers to the other one, means for separately adjusting for each of said rollers the peripheral velocity imparted by said rotating means, adjustable means to press said rollers one against another, the axis of the slowest one of said extreme rollers having a fixed position relatively to said frame, means to displace transversally the other rollers of said spread, independently of each other, and bring the axes thereof into a common diametral plane known as reference plane and passing through said fixed axis of said slowest roller, means to adjust the displacement of said displaceable roller axes relatively to said reference plane, said machine further being such that in operation the axes of said displaceable rollers are alternately offset in opposite directions relatively to said reference plane, said offset being made for each roller relatively to said plane in the same sense as that of its peripheral velocity at its points of contact with the next adjacent slower roller, and the magnitude of said offsets not exceeding 10% of the diameter of said rollers.

4. A roller mill, calender and the like roller machine for the treatment of noncoherent matters, said machine having a frame, a spread of three consecutive rollers with parallel axes rotatably fitted on said frame, the first and last rollers being known as extreme rollers and the other roller as intermediate roller and the axes of said extreme rollers being in the same plane, bearings on said frame for said extreme and intermediate rollers, the bearings of one of said extreme rollers being rigidly fixed on said frame whereas the bearings of the other extreme roller are pivotally fitted on said frame about an axis parallel to said roller axes, means for positively rotating each of said rollers at a given peripheral velocity corresponding to a given speed, with said speeds having alternate directions for the rollers of said spread and said given velocity having substantially increased values from one of said extreme rollers to the other one, means for separately adjusting for each of said rollers the peripheral velocity imparted by said rotating means, adjustable means to press said rollers one against another, said means comprising jacks of controllable length between said fixed bearings and said pivotally fitted bearings of said extreme rollers, means to offset said intermediate roller in a direction substantially perpendicular to said plane, said offsetting means comprising means of adjustable length for pivotally mounting said bearings of said intermediate roller on said frame, said intermediate roller being offset relatively to said plane in the same sense as its peripheral velocity at its points of contact with the slowest one of said extreme rollers, said offset being small relatively to the diameter of said rollers and not exceeding 10% thereof.

5. A roller mill, calender and the like rolling machine for the treatment of noncoherent matters, said machine having a frame, a spread of three consecutive rollers with parallel axes rotatably fitted on said frame, the first and last rollers being known as extreme rollers and the other roller as intermediate roller and the axes of said extreme rollers being in the same plane, bearings on said frame for said extreme and intermediate rollers, the bearings of one said extreme roller being rigidly fixed on said frame whereas the bearings of the other extreme roller are pivotally fitted on said frame about an axis parallel to said roller axes, means for positively rotating each of said rollers at a given peripheral velocity corresponding to a given speed, with said speeds having alternate directions for the rollers of said spread and said given velocity having substantially increased values from one of said extreme rollers to the other one, means for separately adjusting for each of said rollers the peripheral velocity imparted by said rotating means, means of adjustable length mounted between said fixed bearings and said pivotally fitted bearings and attached thereto for adjusting the distance between said extreme rollers, adjustable means to offset said intermediate roller in a direction substantially perpendicular to said plane and to press it against said extreme rollers, said offsetting and pressing means comprising for each bearing of said intermediate roller a jack disposed between said bearing and said frame and pivotally mounted on said frame on an axis parallel to said roller axes, said intermediate roller being offset relatively to said plane in the same sense as its peripheral velocity at its points of contact with the slowest one of said extreme rollers, said offset being small relatively to the diameter of said rollers and not exceeding 10% thereof.

6. A roller mill, calender and the like roller machine for the treatment of noncoherent matters, said machine having a frame, a spread of at least four consecutive rollers with parallel axes rotatably fitted on said frame, the first and last rollers being known as extreme rollers, means for positively rotating each of said rollers of said spread at a given peripheral velocity corresponding to a given speed, with said speeds having alternate directions for the rollers of said spread and said given velocity having substantially increased values from one of said extreme rollers to the other one, means for separately adjusting for each of said rollers the peripheral velocity imparted by said rotating means, bearings on said frame for said rollers, the bearings for the slowest one of said extreme rollers being rigidly fixed on said frame whereas the bearings of the other rollers are pivotally fitted on said frame about axes parallel to said rollers axes, means to displace transversally said other rollers, independently of each other and bring the axes thereof into a common diametral plane known as reference plane and passing through said fixed axis of said slowest roller, adjustable means to press said rollers one against another, said means comprising jacks of adjustable length mounted between said frame and said pivotally fitted bearings of said extreme roller, means to adjust the displacement of said displaceable rollers axes relatively to said reference plane, said displacing means comprising eccentric mounting means for said bearings on said frame, said mill further being such that in operation the axes of said displaceable rollers are alternately offset in opposite directions relatively to said reference plane, said offset being made for each roller relatively to said plane in the same sense as that of its peripheral velocity at its points of contact with the next adjacent slower roller, and the magnitude of said offsets not exceeding 10% of the diameter of said rollers.

References Cited in the file of this patent

UNITED STATES PATENTS 218,756    Marshall _____ Aug. 19, 1879

FOREIGN PATENTS 7,992      Great Britain _____ Mar. 30, 1911
539,975    Great Britain _____ Oct. 1, 1941
640,865    Great Britain _____ Aug. 2, 1950